Jan. 27, 1942.   C. DORNIER, JR   2,271,065
FUSELAGE FOR HYDROAIRCRAFT
Filed Jan. 10, 1939
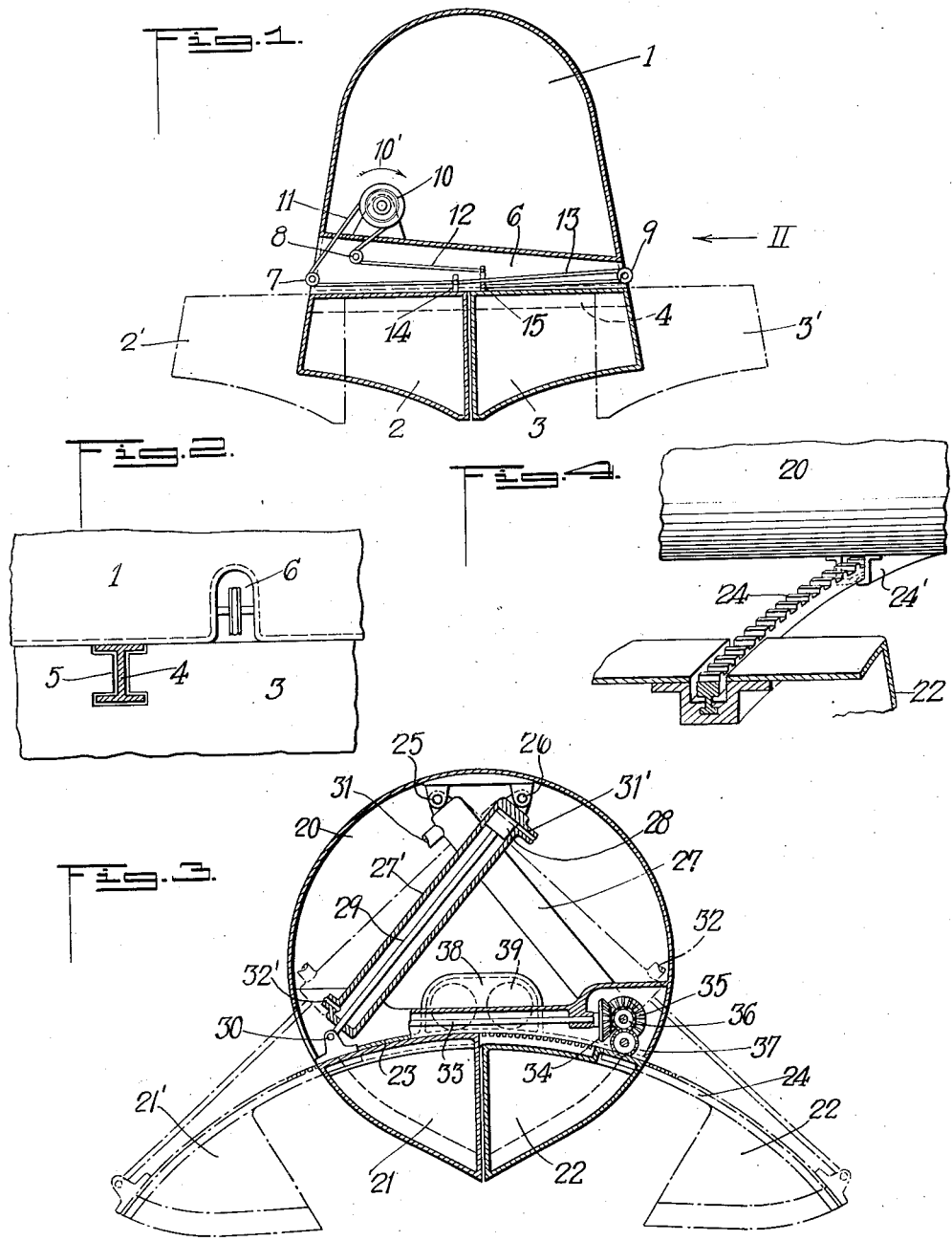
INVENTOR.
CLAUDIUS DORNIER, JUNIOR.
BY
Karl A. Mayr
ATTORNEY.

Patented Jan. 27, 1942

2,271,065

UNITED STATES PATENT OFFICE 2,271,065

FUSELAGE FOR HYDROAIRCRAFT

Claudius Dornier, Jr., Friedrichshafen-on-the-Bodensee, Germany, assignor of one-half to Dornier-Werke G. m. b. H. and one-half to Claude Dornier, senior, both of Friedrichshafen-on-the-Bodensee, Germany Application January 10, 1939, Serial No. 250,150
In Germany January 28, 1938

3 Claims. (Cl. 244—106)

The present invention relates to aircraft adapted to take off from and descend on water, more particularly to flying boats having a fuselage which forms a compact body of small air resistance when in the air and parts of which can be protruded for widening out the support of the aircraft for descending and resting on water and thereby increasing lateral stability of the boat.

The conventional flying boats are provided with a plurality of bodies which act as floats and are adapted to receive passengers and/or freight, or they have a body which is not intended to contact the water and act as float and a plurality of floats. The aerodynamic qualities of these conventional machines are not very good. Flying boats having one fuselage or body only are preferable from an aerodynamic point of view. With the latter type, however, a plurality of stabilizing floats must be provided which cause undersirable air resistance.

Fuselages have been suggested which consist of a body which is not supposed to act as float and adapted to receive the crew, passengers, freight etc. and of a part attached to said body which acts as float. Said float part may be longitudinally divided. The float part or parts are permanently rigidly connected with the fuselage.

According to the present invention a float part as set forth in the paragraph next above is provided which comprises at least two parts which can be laterally displaced at will for landing purposes and which can be retracted to form together with the main fuselage a solid body of small air resistance when the aircraft is in the air. The mechanism for protruding and retracting the individual float members is of such construction that it can be operated from the interior of the fuselage. The float members may be adapted to be laterally so much protracted that their innermost parts remain underneath the main fuselage when in protracted position or they may be constructed to be so far protruded that with the float members fully protracted, the aircraft resembles a conventional one having two floats and a separate fuselage thereinbetween and above. The farther the float members are protruded the better is the lateral stability of the craft on the water. The path of the float parts when being protracted or retracted may be straight or curved. The individual float part may be longitudinally divided.

The lateral protractability of the float parts permits the release of bombs or the like from the upper or main part of the fuselage to be dropped in between said float parts.

Further and other objects of the present invention will be hereinafter set forth in the accompanying specification and shown in the drawing which, by way of illustration, shows what I now consider to be a preferred embodiment of my invention.

The drawing shows two embodiments of the present invention.

Figure 1 is a diagrammatic cross sectional showing of an aircraft body or fuselage according to the present invention.

Figure 2 is a diagrammatical large scale side view of a part of the fuselage shown in Fig. 1 and taken in the direction of arrow II in Fig. 1.

Figure 3 is a diagrammatic cross sectional showing of a modification of an aircraft body or fuselage according to the present invention.

Figure 4 is a large isometric showing of a detail of the construction illustrated in Fig. 3.

Like numerals designate like parts in all figures of the drawing.

Figure 1 diagrammatically shows a cross section of an aircraft fuselage having floats which are protractable and retractable along a straight path. Numeral 1 designates the fuselage body proper which is adapted to receive crew, passengers, freight, operating material, etc. Below this upper part 1 of the fuselage a float part is provided which is longitudinally split into two halves which form laterally displaceable float members 2 and 3. I beam shaped guide members 4 which extend across the outside of the bottom part of part 1 are used for slidably supporting the float members.

Figure 2 shows one of the support members 4 and the parts adjacent thereto in larger scale. Channels 5 are provided in the float members for receiving the guide rails 4.

The lower part of the interior of the fuselage proper 1 is provided with a tunnel or cavity 6 which is open at the bottom and which contains the mechanism for laterally displacing the float members 2 and 3. This mechanism comprises rope pulleys 7, 8 and 9. A rope drum 10 is located in the fuselage proper around which drum the ropes 11 and 12 are wound. Rope 11 runs over pulley 7 and is connected at 14 to the float member 2. Rope 12 runs over pulley 8 and is connected at 15 with the float-half 3. The ends of a rope 13 running around pulley 9 are individually connected with float member 2 at point 14 and with float member 3 at 15. Upon rotation of drum 10 in the direction of the arrow 10' rope 11 is shortened and float member 2 pulled into the position 2' shown in dash and dotted lines. At the same time float member 3 is pulled to the right, as seen in Fig. 1, into the position 3' indicated in dash and dotted lines. If drum 10 is rotated counterclockwise rope 12 is wound to the drum and both float members are retracted and form together with the fuselage proper a body of small air resistance.

Figures 3 and 4 illustrate an embodiment of the present invention in which the float-halves 21 and 22 are protracted laterally downward and along a curved path. The fuselage which is made up of the upper part 20 and the two float members 21 and 22 is of almost true circular cross-sectional configuration except for the keel produced by the protractable floats when in retracted position. The upper part 20 is closed at the bottom by means of the curved closure 23. Guide rails 24 are mounted to the upper part of the float members 21 and 22 and extend transverse to the direction of flight. These rails are adapted to slide in suitable corresponding guides 24' which are connected with the upper part 20 of the fuselage. The guides for the rails 24 of float 21 are staggered with respect to the guides for the rails of float 22 so that the rails of one float do not interfere with the rails of the other float when the floats are fully retracted.

In the embodiment of my invention shown in Figs. 3 and 4 the float-halves are pro- and retracted by hydraulic means. Two cylinders 27 and 27' swingably depend from supports 25 and 26 respectively in the upper part 20 of the fuselage. The cylinders 27 and 27' contain pistons 28 which are individually movably connected with suitable attachments 30 on the floats 21 and 22. If a fluid under pressure is admitted to the cylinders 27 and 27' at 31 and 31' respectively, the pistons 28 are pressed downward and the floats are moved outward into the positions 21' and 22' shown in dash and dotted line in Fig. 3. If fluid under pressure is admitted to the cylinders 27 and 27' underneath the pistons through inlets 32 and 32' the pistons are moved upward and the floats are moved inward. The guide rails or at least some of them may be provided with teeth to form racks. In the interior of part 20 a shaft 33 is provided having a bevel gear wheel 34 at each end. These gear wheels individually mesh with bevel gear wheels 35 which are individually coaxially connected with individual spur gear wheels 36 which are in mesh with pinions 37 which individually also cooperate with individual racks 24. The mechanism 33 to 37 assures true symmetric cooperation of the two floats 21 and 22.

The part 20 of the fuselage may be provided with a niche 38 containing bombs 39 which can be released when the floats 21 and 22 are moved apart.

While I believe the above described embodiments of my invention to be preferred embodiments, I wish it to be understood that I do not desire to be limited to the exact details of design and construction shown and described, for obvious modifications will occur to a person skilled in the art.

I claim:

1. A streamlined aircraft fuselage body comprising an upper part, a float member which is split into two halves, the cross sectional configuration of one half being the reflected image of that of the other half, downwardly curved guide and support members connected with said upper part and extending substantially transverse to the direction of flight, corresponding guide means individually connected with said halves and movably engaging said guide members, moving means connected with said upper part and with both said halves and simultaneously moving said halves in opposite directions along said guide members, said halves, when in innermost position, being adjacent to and below said upper part and forming together a bottom part of said fuselage and, when outwardly moved along said guide members, forming floats supporting and stabilizing said upper part.

2. A streamlined aircraft fuselage comprising an upper part, two float members of similar cross-sectional configuration and being disposed symmetrically with respect to the longitudinal axis of said fuselage and adjacent to and below said upper part and in abutting relation to one another and exclusively forming together a bottom part of said fuselage, runways provided in said upper part and extending substantially horizontally and perpendicularly to the longitudinal axis of said fuselage, said float members being slideably connected with said runways and being adapted to be substantially laterally projected from both sides of said fuselage.

3. A streamlined aircraft fuselage comprising an upper part, two float members of similar cross-sectional configuration and being disposed symmetrically with respect to the longitudinal axis of said fuselage and adjacent to and below said upper part and in abutting relation to one another and exclusively forming together a bottom part of said fuselage, runways provided in said upper part and extending substantially horizontally and perpendicularly to the longitudinal axis of said fuselage, said float members being slideably connected with said runways and being adapted to be substantially laterally projected from both sides of said fuselage, rack members connected with said float members and being slideable in said runways, operating means connected with said float members for moving said rack and float members substantially laterally from both sides of said fuselage for increasing floating stability thereof, and operatively interconnected pinions rotatably connected with said upper part and individually engaging said rack members and assuring simultaneous movement of said float members.

CLAUDIUS DORNIER, Jr.